Sept. 28, 1943.     W. SEYERLE     2,330,633
WHEEL-SUSPENSION ESPECIALLY FOR MOTOR CARS
Filed July 8, 1936     2 Sheets-Sheet 1

Inventor

Sept. 28, 1943.  W. SEYERLE  2,330,633
WHEEL-SUSPENSION ESPECIALLY FOR MOTOR CARS
Filed July 8, 1936    2 Sheets-Sheet 2
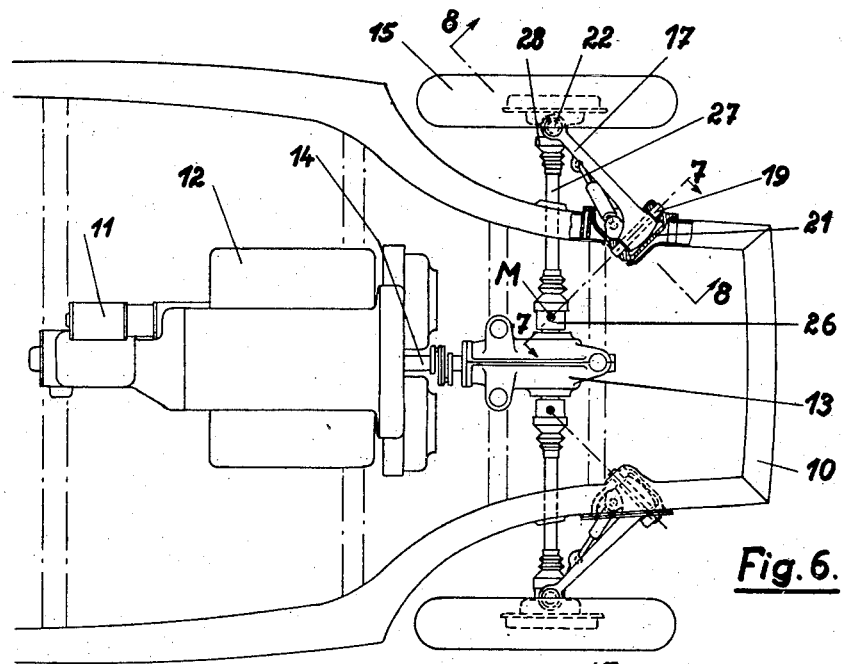
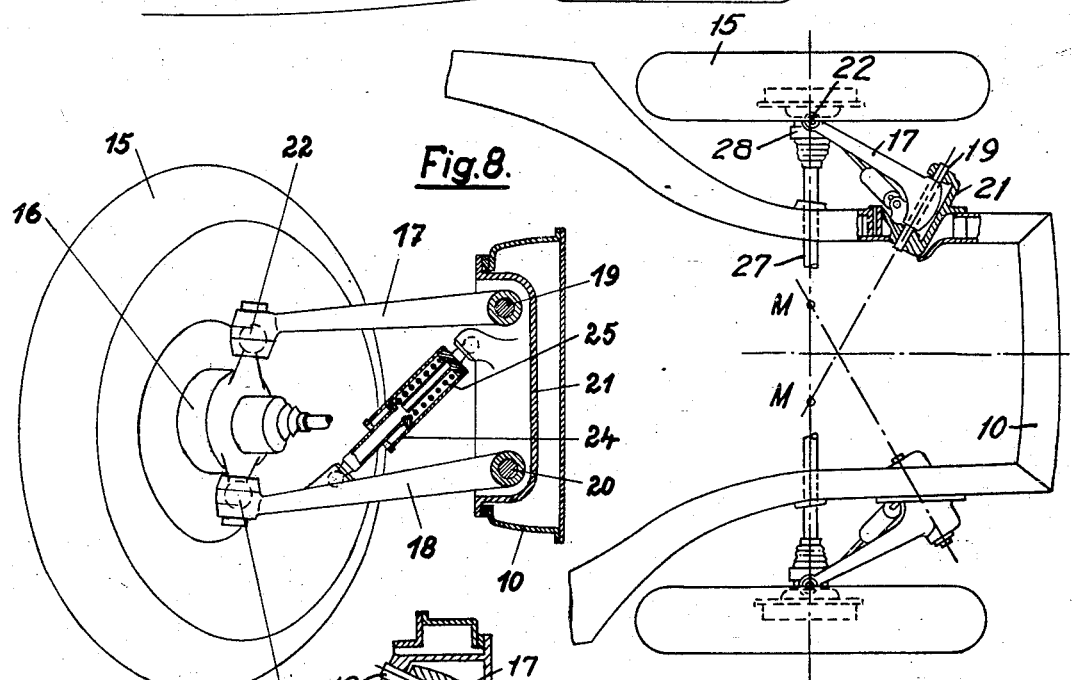
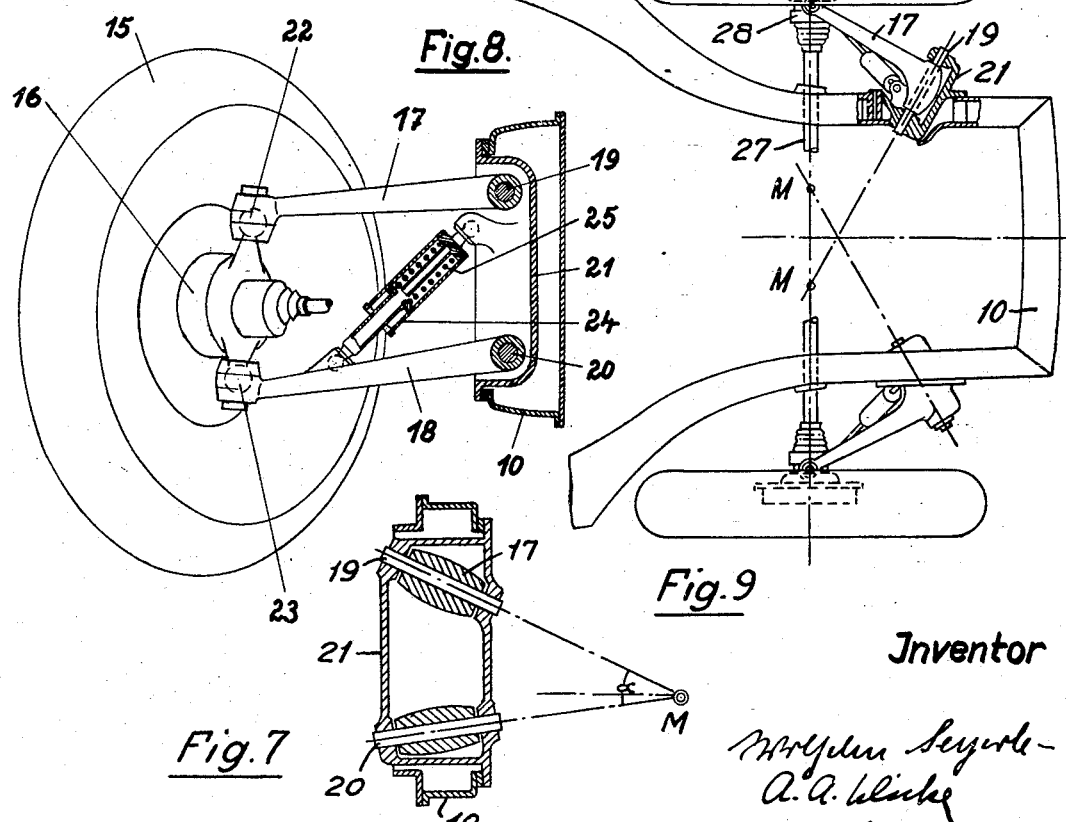
Inventor
Wilhelm Seyerle
A. A. Winke
ATTORNEY Patented Sept. 28, 1943

2,330,633

UNITED STATES PATENT OFFICE 2,330,633

WHEEL SUSPENSION, ESPECIALLY FOR MOTOR CARS

Wilhelm Seyerle, Waldenbronn, near Esslingen-on-the-Neckar, Germany; vested in the Alien Property Custodian Application July 8, 1936, Serial No. 89,515
In Germany July 11, 1935

25 Claims. (Cl. 180—73)

This invention relates to an improved wheel-suspension, intended for use especially in connection with motor vehicles. The main characteristic feature of the invention consists in that the wheel is suspended from the vehicle frame or other suitable part by means of a spatial link-chain, or preferably a spatial link-quadrilateral.

An object of this invention is to provide a novel and improved suspension for the wheels of a vehicle.

Another object of this invention is the provision of a vehicle wheel suspension which combines the advantages of a pendulum semi-axle with those of a parallelogram suspension oscillation in a longitudinal plane.

A further object of this invention is the provision of improved wheel suspension means which results in excellent lateral stability of the vehicle, and simple wheel driving mechanism with only slight variation in track gauge and wheel dish.

Further objects and advantages of this invention will be apparent from consideration of the specification as illustrated by the accompanying drawings of possible embodiments of the invention, in which drawings:

Fig. 6 is a plan view illustrating the preferred improved wheel suspension as applied to a vehicle;

Fig. 7 is a sectional view along the line 7—7 of Fig. 6;

Fig. 8 is a sectional view along the line 8—8 of Fig. 6; and

Fig. 9 is a view of a wheel suspension similar to Fig. 6, but showing a slightly different arrangement.

Figure 1:
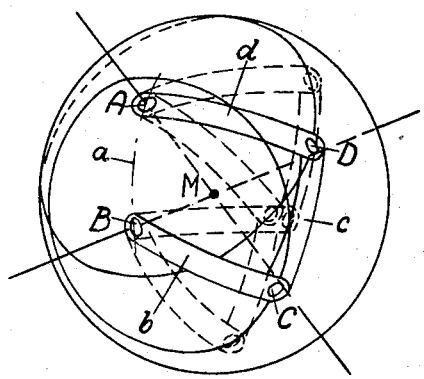
Fig. 1 shows a linkage arrangement for my improved wheel suspension.

The simplest constructional form of a spatial suspension with a link-quadilateral is shown in Fig. 1, in which case all four fulcra lie on a common spherical surface. The stationary side which is formed by the frame or another suitable part connected with the frame as shown as $a=AB$. The links $b$, $c$, and $d$ may be (as shown in the drawings for the sake of greater clearness) bent in the form of the largest spherical arc and are connected with one another, or with the frame, by pivot-joints A, B, C, D. The axes of these joints do not extend, as contrasted with a plane link-quadrilateral parallel to one another, but in accordance with the characteristic feature of a spatial link-quadrilateral, they extend like rays from a common intersecting point M which may be termed the centre of the spatial articulated chain.

The wheel is, as a rule, carried by the link $c$, and its axle can extend in any desired direction, that is to say, substantially radially or substantially tangentially with respect to the spherical surface of the articulated chain, or in any desired angle relatively thereto. The wheel-journal may be arranged in any case, for example, between the joints C and D, in one of these joints, or on an extension of the link beyond the joint.

Figure 2:
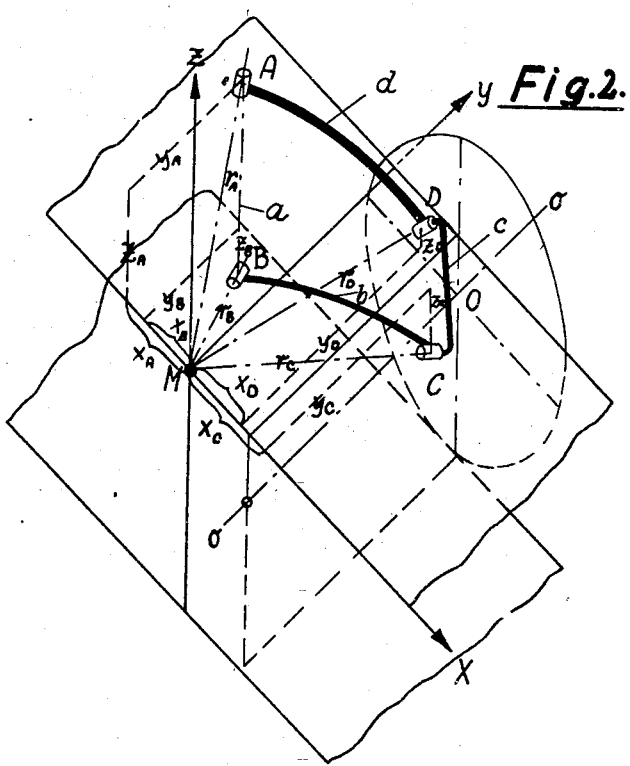
Fig. 2 is a prospective view of a modified arrangement similar to Fig. 1.

In the further example shown in Fig. 2 a wheel-suspension effected with the aid of a spatial link-quadrilateral designed according to this invention is illustrated perspectively. In this figure M denotes the centre of the link-quadrilateral A—B—C—D and is at the same time the point of intersection of the axes of the joints A, B, C, D. Each joint is determined in space by its co-ordinates $x$, $y$, $z$, reckoned from the centre M, whereby the distance $r$, or the direction of the joint axes extending from said centre M is determined. The $x$-direction is assumed as being the direction of running of the car, and the $y$-direction is the horizontal direction transversely thereto, whereas the $z$-direction is assumed to be vertical. The centre-point O of the wheel plane has, correspondingly, the co-ordinates $x_0$, $y_0$ and $z_0$.

In accordance with the arrangement of the centre of the link-quadrilateral relative to the wheel, and in accordance with the position of the individual links or joints an extreme number of different wheel movements, on which the size of the changes in the wheel position depends may be obtained. These changes may relate to the angular position of the wheel, that is to say, to the deviations of the wheel plane from the vertical plane (splay or dish of the wheel), or may relate to the direction of running (obliquity of the wheels), viz. to the position of the steering journal or trunnion, or to the position of the wheel relatively to the frame and body of the car, especially with regard to changes of the gauge and the base of the wheels. It is best for the purpose in view to keep these changes as small as possible.

It is advantageous to lay the centre M not too near to the wheel, as otherwise compensating the change of the angle or of the position of the wheel may become difficult. In an extreme case M may lie at infinity, in which case the spatial link-quadrilateral, if M is shifted into infinity in the $x$-direction, is transformed into a plane link-quadrilateral oscillating in a transverse plane of the car, or if M is shifted into infinity in the $y$-direction, the spatial quadrilateral gets transformed into a plane link-quadrilateral oscillating in a longitudinal plane. Another extreme case is obtained if the stationary points A and B are located near to one another and the angle AMB is reduced to zero, in such a manner, that, according to the position of the point M relatively to the joints A and B a semi-axle oscillating in a transverse plane, or a crank-axle in a longitudinal plane or an oscillating axle oscillating in any desired plane is obtained. By arranging M and the joint points in such a manner that the spatial link-quadrilateral approaches the one or the other extreme case more or less, there may be obtained in a corresponding manner the advantages which any desired of the known constructions present, without giving up the advantages which another known construction presents.

The point M may be located at any desired place, for instance (seen from the middle of the car) outside of the wheel or within the same; furthermore, in front of, or behind, the wheel, and besides, higher than the centre of the wheel or below the centre. As a rule, however, it will be placed at the inner side of the wheel. The link-quadrilateral (or the link-chain) may be designed and arranged as desired. The two links ($b$ and $d$) guiding the wheel may be of equal length or unequal length and they may be shorter or longer than the stationary side ($a$), or than the wheel-carrying link $c$; and they may either cross one another or (seen from the link $c$) be so arranged as to diverge into opposite directions. They may be pulled or shifted or pushed, that is to say, they may be subjected to tensile strain or to compressive strain and may have any desired shape, say forked or cranked, or may even be designed as supporting members. Inwardly bent links will generally be used in connection with steered wheels because of the obliquity of the wheels and outwardly bent links will generally be used in connection with non-steered wheels, especially driven wheels. Besides, the links can extend outside of the wheels, around them, so that the wheels are located between the car frame and said links.

Figure 3:
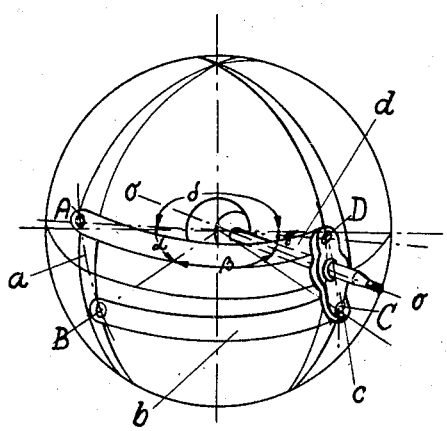
Fig. 3 shows another modified linkage arrangement.
Figure 4:
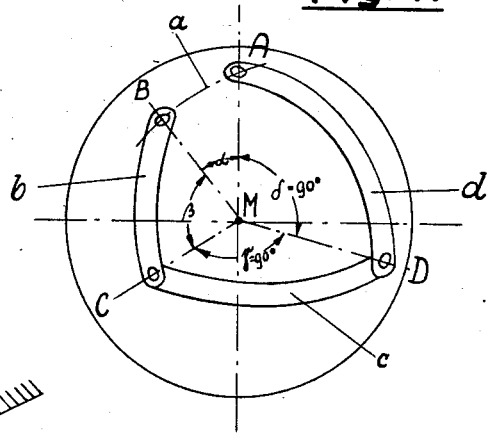
Fig. 4 is still a further form of wheel suspension which may be used.

In the Figs. 3 and 4 are illustrated two special cases, Fig. 3 showing a spatial parallel-crank drive (or spatial parallellogram), and Fig. 4 a spatial crank-chain.

In Fig. 3 the angles $\alpha=\gamma$ and $\beta=\delta$. This figure shows a wheel-drive by means of a link- or joint-chain. If the axle of rotation $o$—$o$ of the wheel, i. e., the wheel pivot is so placed that it intersects the central point M, as do the turning axes of the joints, then only one universal joint arranged in the point M is requisite to turn the wheel. There exist in this case, with regard to the drive, similar conditions as with a pendulum semi-axle. Such a driving arrangement is, of course, possible in connection with any desired spatial joint-chain, provided that the central point has a position suited for the driving joint.

In the example shown in Fig. 4 the link-quadrilateral is formed by a spatial crank chain. The angles $\gamma$ and $\delta$ have in this case a size of 90°. As a stationary side the side A—B or any desired other side may be used, for example, either one of the rectangular sides $c$ or $d$. In Figs. 3 and 4 the joint points A—D are assumed to be equally remote from the point M. The same result may, however, also be attained if the distance radii between the joint points and the point M are different. In an extreme case three rectangles (for instance $\beta=\gamma=\delta=90°$) may be provided.

Figure 5:
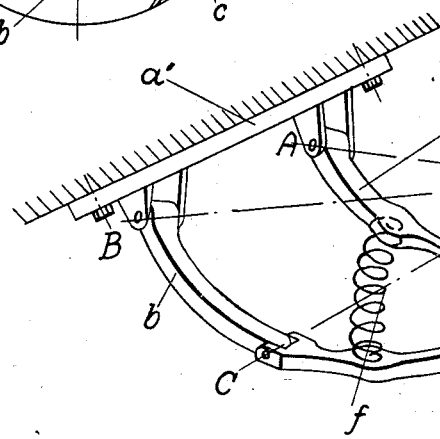
Fig. 5 shows a diagrammatic embodiment of my invention.

In Figure 5 is illustrated diagrammatically a wheel-guide in which a spatial link-quadrilateral is used, the stationary side of which (A—B) is nearly horizontal. The axle journal or pivot of the wheel is arranged upon an extension $c_1$ of the link $c$ and may be located, for instance, at $p$ or at $p'$ or at $p''$. In this latter case ($p''$) the drive may be effected by means of a one-joint shaft, in that the axle journal forms the end of a shaft supported in said extension $c_1$ of the link $c$, the driving joint being provided in the point M.

The link-quadrilateral may be attached to the frame or the like by means of a plate $a'$, this plate forming at the same time the stationary side of the link-quadrilateral and permitting removal of the entire suspension as a whole, including the springs. Such a plate $a'$ or an equivalent therefor may also be used, of course, in connection with the other constructional forms above described. As the spring means, a helical spring $f$ is, as a rule, used, this spring being arranged between the links $c$ and $d$, but it will be obvious to those skilled in the art that the spring can be provided also at another suitable place, as for instance, between the plate $a'$ and the link $b$. Instead of helical springs springs of another configuration can be used, for example torsional bar springs which can be arranged preferably in the joint axles; also rubber springs, pneumatic or hydraulic springs, and so on, may be employed. Furthermore, the links themselves may be elastic, or formed by plate-springs respectively, and separate levers or links for actuating said springs may be used and may be arranged substantially in the longitudinal direction of the car or transversely thereto, or vertically, as best suited in the individual cases.

Instead of the joints, there may be used in certain particular cases, especially where there are axle angles of 90°, curved or straight guide members for the links.

If the wheel is located within the link-levers, that is to say, between these levers and the car body, these further possibilities are presented: the link-levers can be used as a steering lever, that is to say, they can take part in the steering, and they may also be used to carry a rotary wheel lining, in which case the rotatableness, especially in the case of a crank-chain as link-quadrilateral, is obtained with the aid of the existing steering levers, the joint A then serving as a fulcrum for the wheel lining. The same is true of the spatial cross-loop chain having three axle angles, each amounting to 90°.

Referring now to the constructional form illustrated in Figs. 6–8, in which 10 denotes the frame of the car on which is supported the motor 12, which constitutes a unit together with the change-speed gearing 11. The motor may have suspended cylinders arranged, for instance, like the legs of a V, and the frame carries in addition to the motor and said gearing, the axle driving gearing 13 which is preferably supported on rubber. This gearing 13 is driven by means of the shaft 14 which may extend from the change-speed gearing between the cylinders of the motor to the said gearing (13).

The wheels 15 are supported on the wheel carriers 16 supported in turn by links 17 and 18 arranged one over the other by pivots 19 and 20 in a bearing member 21 shown by way of example as inserted into a lateral aperture of the frame and being connected with the frame by means of a flange. Said links are connected with the wheel-carrier 15 by ball-joints 22 and 23 (Fig. 8). The shock-absorption or springing is effected by suitable means such as a helical spring 25 inserted into a telescopical guide sleeve 24.

In Fig. 6 the upper pivot-joint by which the upper link 17 is connected with the frame is shown in axial section for the sake of greater distinctness. The actual position of the pivot 19 and the pivot 20 appears, however, from Fig. 7. Their axes are arranged with respect to one another in an angle α in such a manner that they intersect in the point M which is located laterally from the axle gearing in the axis of the wheel 15. This point M forms at the same time the centre of a Cardan-joint 26 by means of which the driving motion is transmitted from the axle gearing 13 to the wheel, said joint 26 being driven across a joint-shaft 27 and another Cardan-joint 28 which, however, may be dispensed with if the wheels concerned are not steering wheels.

With this arrangement of the parts just described the upper link oscillates on the axis of the pivot 19 and the lower link oscillates around the axis of the pivot 20. Together with the wheel-carrier 16 the links 17 and 18 form a spatial link-quadrilateral, the centre of which is formed by the point M, that is to say, the rotary axes of all joints 19, 20, 22 and 23 extend through that point M. Every point of the link-quadrilateral thus always maintains a constant distance from the point M when the wheel rises. Thus, the arrangement of the driving joint 26 in the point M produces the most favorable driving conditions, and with non-steered wheels the axle shaft 27 can drive the wheel 15 without an intermediate joint so that it can be rigidly connected with the wheel pivot of the same.

As previously pointed out, the position of the point M may be varied within large limits. It has sometimes been found advantageous to have the point of intersection M on the opposite side of the longitudinal central axis of the vehicle from the pivoted wheel. Such a construction is illustrated in Fig. 9 in which the wheel and supporting elements are identified by reference numerals identical with those shown in Fig. 6. The parts are the same, but instead of the pivot axes intersecting at a point on the near side of the longitudinal central axis, they have been shifted to intersect at a point on the far side thereof. The resulting movement of the wheel results in certain advantages not present in the construction illustrated in Fig. 6 although the path of movement follows the general rule previously outlined.

The term "frame" as herein used is not to be understood as limited to such devices when formed separate from the body or coach work of the vehicle, but as including such devices when formed integrally with or intimately interconnected with said body or coach work of the vehicle.

It will be noted that the construction shown and described will serve admirably to accomplish the objects stated above. It is to be understood, however, that the construction disclosed above is intended merely as illustrative of the invention and not as limiting, as various modifications thereof may be made without departing from the invention as defined by a proper interpretation of the claims which follow.

I claim:

1. In a vehicle having wheels and a frame, means for suspending said wheels independently of one another, comprising at least three link members forming a spatial link chain serially jointed, means for connecting the end links of said chain to said frame in such a manner that an intermediate link member is guided by the two end links only, the connection of the link members with one another and of the end links with the frame being so designed that the parts connected with one another are turnable on axes intersecting substantially in a common point which does not lie at infinity, and means for carrying a wheel on said intermediate link member.

2. In a vehicle having wheels and a frame, means for suspending said wheels independently of one another, comprising three link members forming a spatial link chain serially jointed, means for connecting the end links of said chain to said frame in such a manner that the middle link is guided by the two end links only, the connection of the link members with one another and of the end links with the frame being so designed that the parts connected with one another are turnable on axes intersecting substantially in a common point which does not lie at infinity, and means for carrying one of said wheels on said middle link member.

3. In a vehicle having wheels and a frame, means for suspending said wheels independently of one another comprising at least three link members forming a spatial link chain serially jointed, and pivot joints for connecting the end links of said chain to said frame in such a manner that an intermediate link member is guided by the two end links only, pivot joints for connecting every two adjacent links to one another, said pivot joints being arranged in such a manner that their turning axes intersect substantially in a common point which does not lie at infinity, and means for carrying a wheel on said intermediate link member.

4. In a vehicle, the combination according to claim 1 in which the means for carrying said wheel comprises a wheel pivot the axis of which extends substantially at right angles relative to a straight line connecting the center of the wheel with the common intersecting point.

5. In a vehicle, the combination according to claim 1 in which the means for carrying one of said wheels comprises a wheel pivot the axis of which extends substantially through said common point of intersection of the axes.

6. In a vehicle, the combination according to claim 1, in which the means for carrying one of said wheels comprises a wheel pivot the axis of which extends substantially through said common point of intersection of the axes, in combination with a driving shaft co-axial with said wheel pivot and driving said wheel pivot, and a driving joint for driving said shaft, said joint positioned in the common point of intersection of the axes.

7. In a vehicle having wheels and a frame, means for suspending said wheels independently of one another, comprising three link members forming a spatial link chain serially jointed, means for connecting the end links of said chain to said frame, means for jointedly connecting the middle link of said chain with said end link members, the connection of the link members with one another and of the end links with the frame being so designed that the parts connected with one another are turnable relatively to one another on axes intersecting substantially in a common point which does not lie at infinity, means on one of said links for carrying one of said wheels, comprising a wheel pivot the axis of which extends through the common point of intersection, a driving shaft co-axial with said pivot and rigidly connected to the same and a driving joint for driving said shaft positioned in the common point of intersection.

8. In a vehicle, the combination according to claim 1, in which the common point of intersection lies at that side of the longitudinal middle plane of the vehicle opposite to the wheel.

9. In a vehicle, having wheels and a frame, means for suspending said wheels independently of one another, comprising three link members forming a self-supporting spatial link chain serially jointed, means for connecting the end links of said chain to said frame and the middle link member to said end links in such a manner that the parts connected with one another turn relatively to one another on fixed axes intersecting substantially in a common point which does not lie at infinity, and the angle between the axis about which one end link member swings relative to the frame, and the axis about which it swings relative to the middle link is substantially as large as the angle between the corresponding axes of the other end link, and means on one of said chain members for carrying one of said wheels.

10. In a vehicle, the combination according to claim 9 in which the two axes of rotation of the middle link form relatively to the two end links the same angle as is formed by the axes of rotation of the two end links relative to the frame.

11. In a vehicle, the combination according to claim 2 in which the two axes of rotation of every link member relative to that part to which each link is connected form angles of substantially 90 degrees.

12. In a vehicle, the combination according to claim 2 in which the means for carrying one of said wheels on one of said link members comprises a wheel pivot attached to said middle link member and extending therefrom in the direction toward the common point of intersection so that the wheel supported on said pivot is positioned between said link member and said point of intersection.

13. In a vehicle, the combination according to claim 2 in which the means for carrying one of said wheels on one of said link members comprises a wheel pivot, and in which said middle link member extends beyond the point of connection with an adjacent link member, said wheel pivot being positioned on said extension.

14. In a vehicle, the combination according to claim 1 including a supporting member detachably attached to said frame to which the two end link members are connected.

15. In a vehicle, the combination according to claim 2 in which the means for connecting the end link members with the frame comprise pivot joints the axes of which are directed toward the common point of intersection, and the means for connecting the middle link to the end link member comprises joints movable in all directions.

16. In a vehicle, the combination according to claim 1 in which the means for carrying one of said wheels on one of said link members comprises a wheel pivot, the axis of which extends at an angle relatively to a straight line connecting the center of the wheel with the common point of intersection of the axes.

17. In a vehicle having a wheel and a frame, means for connecting said wheel to said frame independently of the other wheels, comprising a link member, means for jointedly connecting the link member with the frame in such a manner that the link member swings relative to the frame about an axis determined by said means, a further link member, means for jointedly connecting the same with the frame in such a manner that it swings relative to the frame about an axis which intersects in a point the first mentioned axis at an angle, a third intermediate link member, means on said third member for carrying said wheel, means for jointedly connecting said third link member with said first link member and means for jointedly connecting said third link member with said second link member in such a manner that the third link member is guided exclusively by said two first link members, and the third link member swings relative to each of the two first link members about an axis which extends through the said point of intersection.

18. In a vehicle, the combination according to claim 17 in which the means for jointedly connecting the two first named link members with the frame comprise pin-like trunnions whose axes extend through said point of intersection.

19. In a vehicle, the combination according to claim 17, in which the means for connecting the two first named link members with the frame on the one side and with the third link member on the other side comprise pin-like trunnions the axes of which extend through the said point of intersection.

20. In a vehicle, the combination according to claim 17, in which the means for jointedly connecting the two first named link members with the frame comprise pin-like trunnions whose axes extend through the said point of intersection, and the means for jointedly connecting the third middle link member with the two other link members comprising spherical joints movable in all directions.

21. In a vehicle, the combination according to claim 17, in which the means for jointedly connecting the third middle link member with the two other link members comprises spherical joints movable in all directions whereby the third link member can be turned about an axis extending through the two spherical joints.

22. In a vehicle, the combination according to claim 17, in combination with a driving shaft for the wheel, and a driving joint driving said shaft the midpoint of which coincides with said point of intersection.

23. In a vehicle, the combination according to claim 17 in which the axes about which the two first named guiding members swing relative to the frame in plan view appear as extending at an angle to the central longitudinal plane of the vehicle and the said common point of intersection lies in the vertical plane extending through the wheel center transverse to the direction of travel, in combination with a driving shaft for said wheel, and a driving joint driving the shaft, the midpoint of which coincides with said point of intersection.

24. In a vehicle, a frame, a plurality of road wheels, each connected to said frame independently of the other road wheels, said connecting means comprising a linkage consisting of at least three links connected in series, means for pivoting the free ends of the end links to said frame, and means for connecting the intermediate link to said road wheel, the links being so connected together and the end links being so connected to the frame that the movement between the links and between the end link and the chassis are about axes which intersect in a common point which does not lie at infinity, and transversely movable springing means for said road wheel, so constructed and arranged that it freely follows transverse movements of the road wheel.

25. In a vehicle having wheels and a frame, means for suspending said wheels independently of one another, comprising three link members forming a spatial link chain serially jointed, means for connecting the end links of said chain to said frame, means for jointedly connecting the middle link of said chain with said end link members, the connection of the link members with one another and of the end links with the frame being so designed that the parts connected with one another are turnable relatively to one another on axes intersecting substantially in a common point which does not lie at infinity, means on one of said links for carrying one of said wheels, comprising a wheel pivot the axis of which extends through the common point of intersection.

WILHELM SEYERLE.